March 15, 1966  G. F. QUITTNER  3,241,058
FLAW DETECTING APPARATUS HAVING NULL PLANE POSITIONED
SENSORS WHICH ARE SERIES CONNECTED
Filed Aug. 22, 1962  4 Sheets-Sheet 1
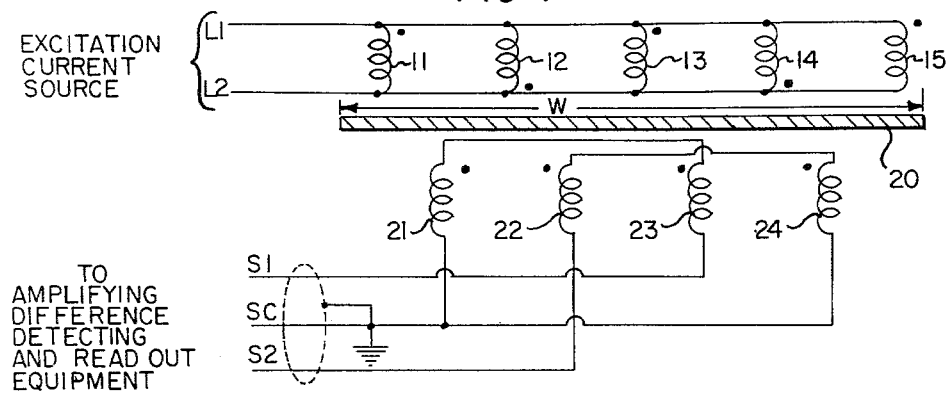
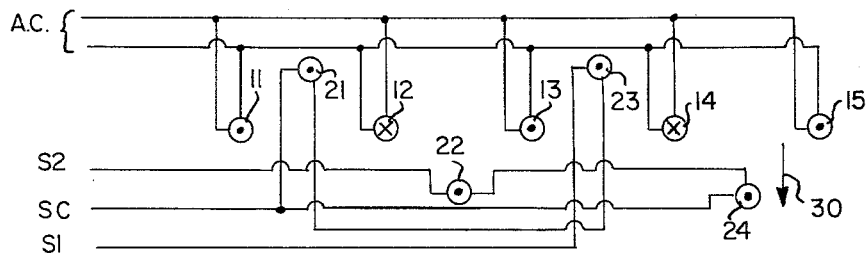
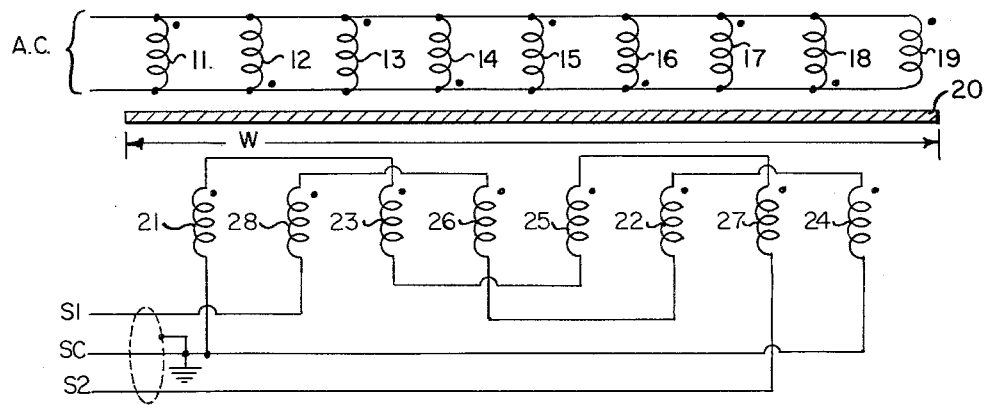
INVENTOR.
GEORGE F. QUITTNER
BY Richard MacCutcheon
ATTORNEY

INVENTOR.
GEORGE F. QUITTNER
BY
ATTORNEY

March 15, 1966  G. F. QUITTNER  3,241,058
FLAW DETECTING APPARATUS HAVING NULL PLANE POSITIONED
SENSORS WHICH ARE SERIES CONNECTED
Filed Aug. 22, 1962  4 Sheets-Sheet 4
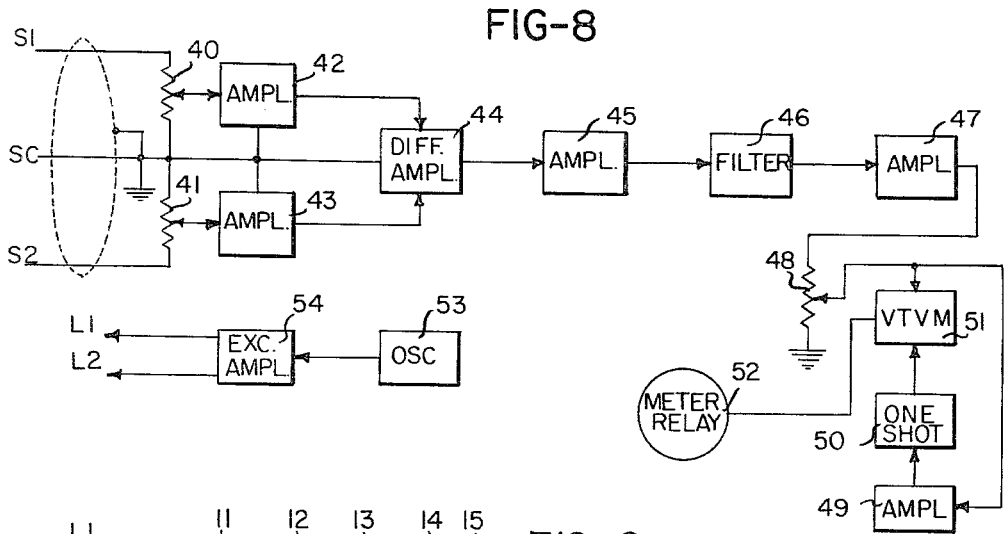
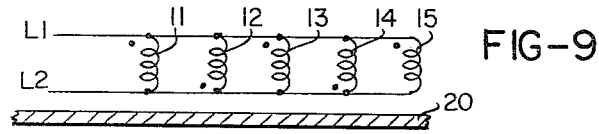
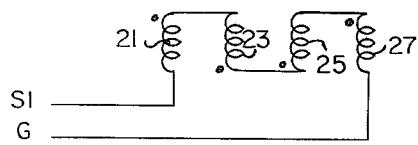
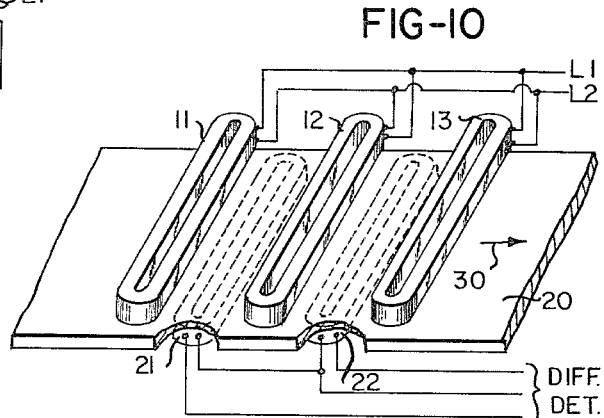
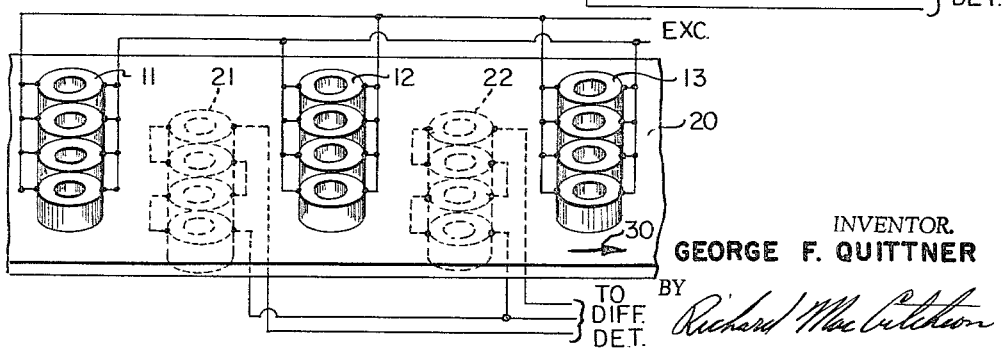
INVENTOR.
GEORGE F. QUITTNER
BY Richard MacCutcheon
ATTORNEY

United States Patent Office 3,241,058
Patented Mar. 15, 1966

3,241,058
FLAW DETECTING APPARATUS HAVING NULL PLANE POSITIONED SENSORS WHICH ARE SERIES CONNECTED
George F. Quittner, Cleveland Heights, Ohio, assignor, by mesne assignments, to API Instruments Company, Chesterland, Ohio, a corporation of Ohio
Filed Aug. 22, 1962, Ser. No. 218,781
7 Claims. (Cl. 324—40)

The present invention relates to magnetic and/or eddy current flaw detection devices and is believed to have particular significance in connection with electrically conductive material when shaped so as to be much more extensive in two dimensions than in the third. Thus the invention has significance in connection with the inspection of metal sheet and/or tubing, a tube being merely a sheet-like shape closed upon itself. In one aspect the present invention discloses and claims improvements over the arrangements disclosed and claimed in co-pending patent application of N. A. Herrick, Serial No. 159,-497, filed December 15, 1961, now Patent 3,156,862, issued November 10, 1964, assigned to the assignee of the present invention.

As described in the above mentioned application, two electrically energized coils act as exciter coils and, when properly polarized, establish a null plane between themselves. An extension of the plane extends through the sample. Sensing coil means, according to Herrick, located on the opposite side of sample from exciter coils, are disposed in such manner as to take advantage of the null plane to provide a null signal except when there is a flaw. By connecting two sensing coils through amplifiers to difference detecting means it is possible to further reduce the "null" signal, and thus increase the sensitivity of the apparatus to sought for sample differences while the Herrick null plane discovery makes the apparatus less responsive to certain movements of the sample and other factors causing unwanted electrical "noise."

For a given effect, it would appear that the larger the diameter of any sensing coil, the greater is the area to which it can respond if there is eddy current flow within this sample area, but the smaller would be the unbalancing effect which the presence of a given defect would have on the residual signal from the difference detection means. In other words, the sensitivity of the system seems inherently inversely proportional to the area being at any instant inspected.

For some inspection problems this limitation offers little disadvantage. For example, in locating butt-welds in strip (sheet) material, since the weld extends completely across the sheet, inspection of any relatively narrow strip along the length of the sheet is effectually equivalent to examination of the entire width of the sheet.

For the greater number of practical cases, however, the above described characteristic limitation is a great disadvantage, and in some cases it makes the use of eddy current inspection economically impractical. For example, a sheet of steel might be eight feet wide in a particular mill, and for a particular set of conditions including sheet speed, sheet thickness, and degree of non-parallel motion, it might be determined that to reliably locate laminations and other defects the area inspected per double channel should not exceed six inches across the sheet. Then, sixteen double channel electronic systems would be required, with attendant problems of first cost, adjustment and maintenance.

It should further be understood that in the operation of null systems, such as those herein discussed, the sensitivity of the apparatus critically depends upon minimizing the residual "null signal" for example, a halving of residual null signal may be tantamount to multiplying usable sensitivity by a factor greater than two. How effective null signal reduction may be in practice depends on many environmental factors, but in general the reduction of residual or carrier signal is always advantageous.

It is therefore an object of the present invention to increase sample area inspected per signal processing channel without thereby reducing the sensitivity of detection.

Another object is to provide arrangements whereby relatively simple, low cost apparatus can sensitively inspect large sample areas.

Another object is to achieve relatively greater sensitivity to small defects by providing improved means for reducing null signal voltage.

Another object is to provide improvements which are applicable to both "through the sheet" and one side of the sheet arrangements.

Another object is to provide means which result in the avoidance of loading one sensing coil with another.

Other objects and advantages will become apparent and the invention may be better understood from consideration of the following description taken in connection with the accompanying drawings, in which:

FIG. 1 is a simplified schematic diagram of an arrangement according to one aspect of the present invention;

FIG. 2 is a top view of the arrangement in FIG. 1 but with the sample removed;

FIG. 3 illustrates a modification, for inspecting wider sheets;

Figure 4:
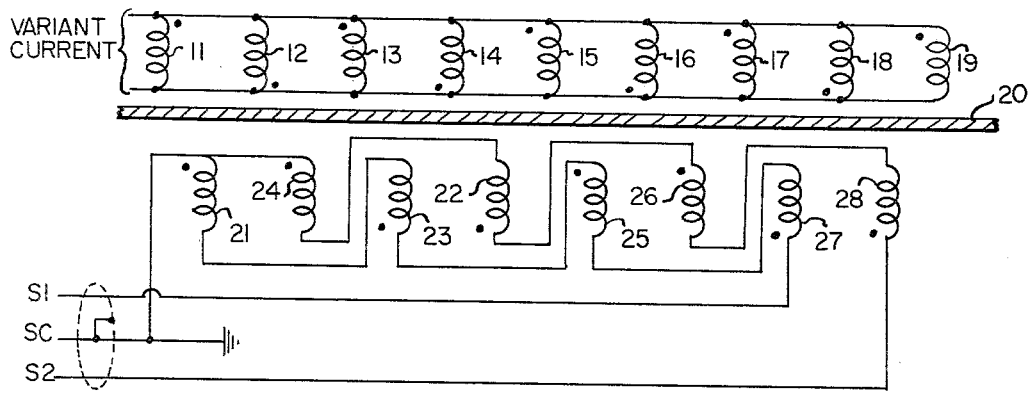
FIGS. 4–7 show other modifications.

FIG. 8 schematically shows a general plan of electronic signal processing equipment suitable for use with the pickup means described herein;

FIG. 9 shows an application of the present invention for the detection of flaws without the use of difference detection;

FIG. 10 shows a wide coil pickup arrangement; and

FIG. 11 shows a narrow coil pickup arrangement suitable for the inspection of wide sheets in accordance with a preferred embodiment of the present invention.

In a co-pending application Serial No. 218,783, filed August 22, 1962, I have illustrated and described various arrangements which may be generally summed up by calling them single-side-of-sheet inspection techniques utilizing null planes.

The present invention is believed to have application whether sensing coils and exciter coils are located on opposite sides of sheets as envisioned by Herrick, or located on same side of sheet as in my above mentioned patent application. In either event the exciter coils may be arranged with their axes at substantially right angles to a sample of material to be inspected for flaws, and so may the sensing coil or coils. As shown in the drawings hereafter described (except FIG. 11) the total number of excitation coils is odd, and half of one less than the total number has one instantaneous polarity while the remainder has opposite polarity (as geometrically related to the nearby sample surface). FIG. 11 follows the same pattern but with groups of series connected coils considered the same as "coils," in accordance with one aspect of the present invention and as hereafter more fully explained. Each sensing coil is located so that its axis, or a projection of its axis, falls substantially in an imaginary surface which Herrick has designated as a null plane passing between two oppositely phased excitation coils and where the field of one equals and thus cancels the field of opposite polarity from the other in the absence of flaw signal.

According to another aspect of the invention sensing coils are connected in series by pairs or by groups of more than two and thus into independent circuits (which may, however, share a common terminal or ground connection). Each member of such a pair or group may, according to one aspect, be connected in series opposition to the previously connected member of the group or pair so that any residual null voltages due to incorrect pickup coil position can be subtracted in the series connection.

According to yet another aspect, series connection (with or without opposition) is used for a group of sensing coils resulting in higher impedance at the amplifier input and avoidance of loading one sensing coil with another.

Referring now to FIG. 1, a simple embodiment is schematically shown. Here exciter coils 11–15, respectively, are connected in parallel to an A.C. source. As indicated by the dot convention, the coils are so wound and connected that the instantaneous magnetic polarity of successively adjacent coils is opposite, for example at coil ends nearest a sample 20 assumed traveling with respect to coils out of the plane of the paper (i.e., transverse to sheet width "W"). The sample is relatively extended in two directions, and on the same side of the sample, or on the opposite side as shown for simplicity in FIG. 1, sensing coils 21–24, respectively, are located with their axes substantially in null planes established between adjacent, and thus oppositely phased, exciter coils. In the arrangement shown in FIG. 1, the sensing (or pickup) coils are connected in two series circuits having a common reference terminal SC and outside terminals S1 and S2 which may, for discussion purposes, be called signal terminals. Of course if a sensing coil were really in a null plane it should have no polarity, but extraneous noise, harmonics, exciter coil geometry anomalies, inexactness of sensing coil position, and any sample defects as well, induce voltages in a coil so that it can be said to have a polarity, particularly when compared with another sensing coil, according to whether the coils under consideration are wound in space the same and connected the same or whether one of these factors varies from coil to coil. Accordingly it can be stated that in the series circuit from SC to S1, the two coils 21 and 23 are series connected oppositely as regards instantaneous polarity (being connected front to front) while in the other series circuit coils 22 and 24 are likewise series connected with opposing polarity as indicated by the dot convention. Another way of stating it is to say that the sensing coils of each series circuit pair are wound and connected so that if they were subjected to excitation from exciter coils wound and connected to all be of like polarity (as they are not) the sensing coils would subtract and cancel the signal in each series pair (or multi-pair) circuit.

For clarity FIG. 2 shows a top schematic view of all the coils of FIG. 1 with the sample removed. Here the opposite polarities of exciter coils 11–15 are indicated by the presence or absence of a central dot. Polarity is likewise indicated for the sensing coils 21–24, shown in FIG. 2 with their circuit terminations S1, SC, S2. The exciter coils 11–15 are shown having axes in a parallel line across the width W of sheet 20 (see FIG. 1) which is assumed traveling in the direction of arrow 30 (see FIG. 2). The sensing coils may fall along the same line (across the sheet width) or, optionally, they may be arranged as shown in FIG. 2 with 21 and 23 having axes establishing a centerline parallel to and "leading" the centerline of exciter axes, and 22 and 24 having axes establishing a centerline parallel to and equidistant on the other side of (that is, so far as any particular spot on sample traveling in direction of arrow 30 is concerned, "lagging") the centerline through exciter axes. Each offset distance may be about half the distance between exciter coils and an advantage of the offset resides in consequent ability of the apparatus to locate a defect like a weld which reaches all across the sheet.

From consideration of FIGS. 1 and 2 it is apparent that each sensing coil 21, 22, 23 or 24, is positioned approximately midway between two exciter coils (when the arrangement is viewed along the coil axes) having opposite instantaneous magnetic polarity. Precise preferred location can be readily determined by making small position adjustments while examining the electrical output voltage from an individual sensing coil, and selecting the position which yields minimum output voltage, although this may be compromised slightly by the requirement that the residual voltage be in phase with the residual from another such pickup coil so that later amplifying, difference detecting, and signal processing circuits can provide the lowest possible null (difference) output signal in the absence of sample inhomogeneities.

When the general principles under discussion are utilized, some residual output from individual sensing coils may still be found. This residual output may arise from such sources as asymmetry in the excitation current waveform, harmonic content in the excitation current waveform, and/or nonlinearity of transfer through the sample due to sample magnetization characteristics. Because it is desirable to minimize such residual or "null" voltage, the present invention makes a valuable contribution in suggesting that two (or a greater number of) pickup coils be placed in a series circuit and so connected that such residual voltages are in series opposition. Therefore the coils are connected subtractively so that the resultant null voltage can be significantly reduced, causing an effective improvement in over-all system sensitivity.

The arrangement of FIG. 3 allows a large sheet width to be handled without relative reduction in ability to sense small flaws. Within the FIG. 3 across the sheet width "W" there are nine exciter coils 11–19 oppositely polarized by successive adjacency. More or less in the null planes thus established are eight sensing coils 21–28, respectively. The sensing coils are connected as before (except that there are more of them) but again they end up in only two signal processing lines S1, S2. Because of the series opposition connection of sensing coils in each series circuit, the residual null voltages, instead of becoming larger as the number of pickup coils increases, remain the same or may even be made smaller in some practical instances.

Another embodiment is shown in FIG. 4, careful inspection of which will show that the only real difference (over FIG. 3) is in the way in which the various sensing coils are series connected. As indicated by the dot convention, again the desired subtractive relationship is maintained although this time it results in slightly different coil connections. For each of FIGS. 1–4 (and FIG. 5 and, for the most part, FIGS. 6 and 7 as well) a significant point is that disadvantage of having adjacently successive sensing coils in same series circuit is avoided. This minimizes the likelihood of a flaw appearing in such location that only one signal line circuit would be "denulled" so that full advantage of the three wire difference detection would not be taken.

Figure 5:
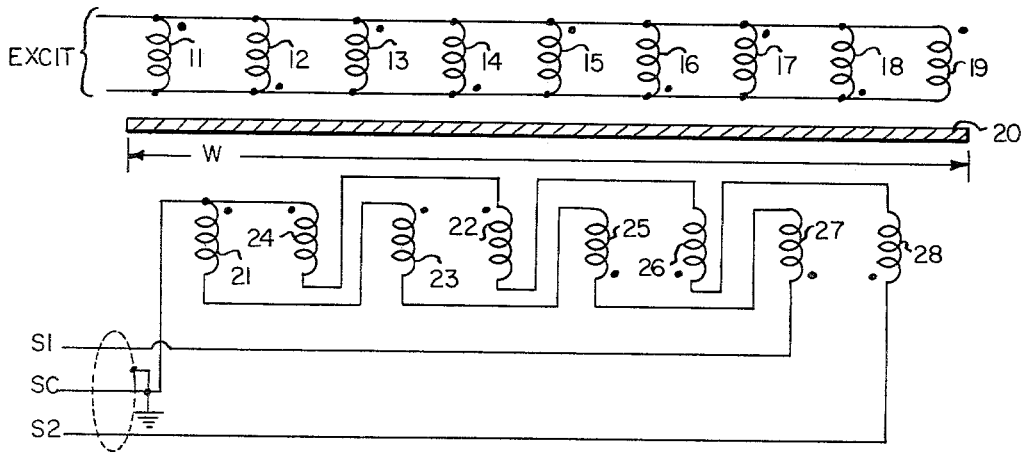

In FIG. 5 it is illustrated that the *order* of sequential coil connection for polarity reversal is not the critical factor in practicing this aspect of the invention. For the subtractive series relationship, the sequence of sensing coil connection is quite permutable providing (preferably) that in a given series circuit there are as many sensing coils connected in one polarity sense as in the opposite polarity sense.

Supposing, however, that all the coils and the difference amplifying means were adjusted for lowest null voltage (with an arrangement such as that shown in FIG. 5 and with a sample having a sheet width W extending beyond the outermost exciter coils) and that then a narrower sheet were introduced. All the carefully balanced voltages would be incorrect and require complete readjustment.

Figure 6:
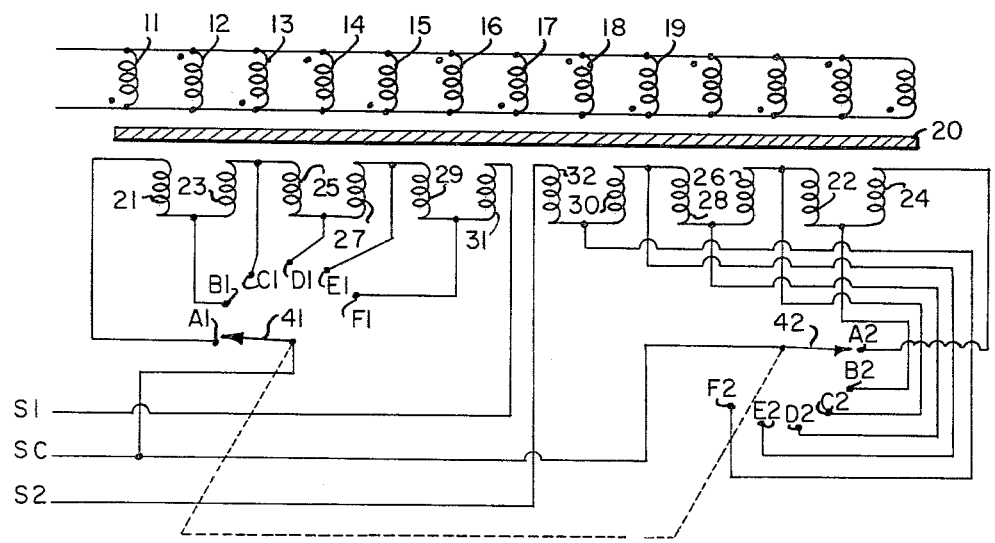

In the embodiment of FIG. 6, switching means are supplied to avoid the last mentioned difficulty. In FIG. 6, switch wipers 41 and 42 can, for example, be placed at positions $A_1$–$A_2$ in which case all sensing coils are connected. When a somewhat narrower sheet is used, 41 and 42 may be placed at positions $B_1$–$B_2$, in which case pickup coils 21 and 24 would be out of service but the existing desired balance would be preserved except for a possible small loss of balance due to the absence of harmonic and signal distortion by coils 21 and 24. A still narrower sheet might require use of only three pickup coils each side of sheet center, in which case 41, 42 would be connected to $D_1$–$D_2$. Such a switching arrangement also aids greatly in setting up correct coil positions. Thus balancing could begin with 41–42 at positions $F_1$–$F_2$ so that only one pair of pickup coils is connected. When these coils are positioned accurately, the switch is connected to $E_1$–$E_2$ and the newly connected coils are positioned. This procedure is followed until all coils are adjusted. It is thus assured that good balance will exist for all positions of 41–42.

Figure 7:
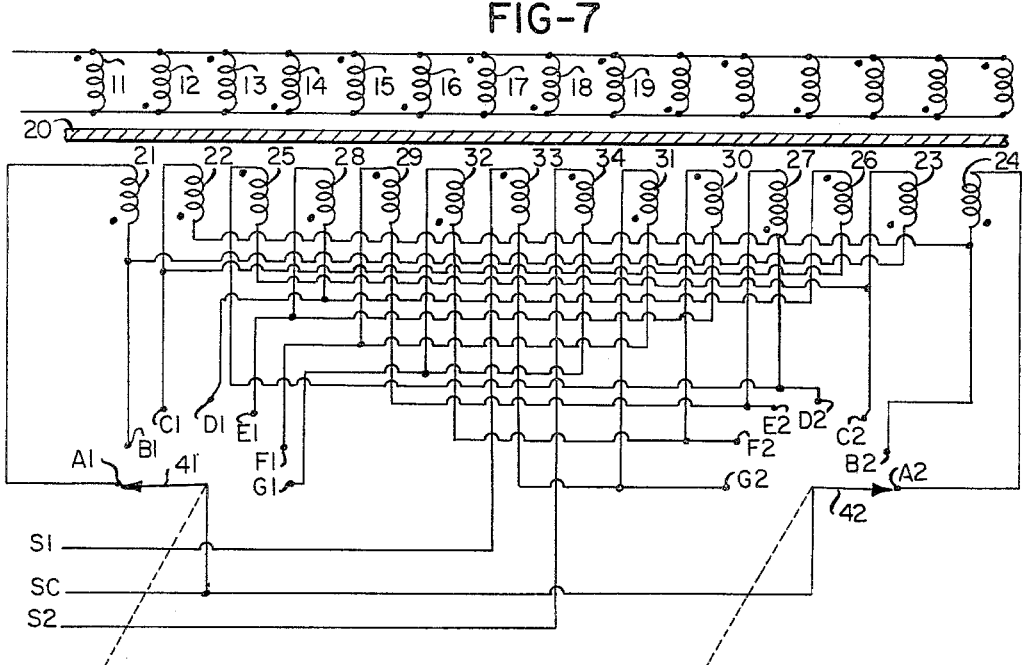

FIG. 7 shows a modified arrangement which is advantageous under certain plant conditions. All of the features of FIG. 6 are retained, and in addition it is arranged that adjacent pickup coils are wired alternately into the two series circuits. Thus, whereas in FIG. 6 sensing coil 21 is located physically adjacent to coil 23 which is connected in series with it in the series string terminating at S1, in FIG. 7 coil 21 is physically adjacent coil 22, and these two coils are wired in different series circuits. Thus in FIG. 7 coil 21 is adjacent to coil 22 but coil 21 is in the circuit terminating at S1 whereas coil 22 is in the series circuit terminating at S2.

While the feature is not illustrated in the present case drawings, for some conditions it is desirable to switch exciter coils in and out of circuit simultaneously with sensing coils. While a relatively remote exciter coil (when energized) may contribute just a little to the field at a particular null plane, the series opposition of sensing coils feature of the present invention makes possible such extremely low amplitude residuals that such quite small field differences can appear significantly at the circuit terminations, but they can be switched out side for side.

Signal processing means suitable for use with the present invention are shown in outline form in FIG. 8, in which a grounded terminal SC and signal line terminals S1–S2 are assumed connected to like numbered lines in any of the prior figures. For convenience the two signal voltages are independently adjustable by voltage dividers 40 and 41 and, as shown, although this is not essential, separate input amplifiers 42 and 43 are used to bring the signal voltages (if any) to a suitable level for a difference detection amplifier 44. Adjustment of voltage dividers 40 and 41 permit accurate nulling under many conditions, permitting reduction of non-flaw output voltage from the difference detector amplifier 44. Additional amplifiers 45 and 47 may be used, and a filter 46 may be interposed to remove irrelevant sheet motion noise from the main signal in preparing the latter for final read-out. A final voltage divider 48 is often helpful for adjusting signal level. A more or less conventional common cathode vacuum tube volt meter is indicated at 51. Into it signals and any remaining noise are fed directly from divider 48 while an amplifier 49 and one shot multivibrator 50 can react to the shortest signal pulse and independently operate the vacuum tube volt meter and its electromechanical output which is shown as a meter relay 52. To provide excitation a conventional oscillator 53 and amplifier 54 may be used to energize the exciter coils via the lines $L_1$ and $L_2$.

FIG. 9 shows just about half of FIG. 4 or FIG. 5 and is included because it has been found that flaws may be detected without requiring the use of difference detection through a two-channel arrangement as above described. Since the voltages developed by sensing coils 21 and 23 in FIG. 9 are subtracted from the voltages developed in coils 25 and 27, the non-flaw output at terminals S1 and G will be quite low, and usable flaw signals can be produced in this way particularly where economy is of utmost importance, and only relatively serious flaws are to be found, and sample motion is constant enough to permit of this. Obviously then, the more complex arrangements of FIGS. 1–8 are preferred for many applications.

In general it can be stated that according to the embodiments of the present invention disclosed in FIGS. 1–7 and 9 there are at least two sensing coils electrically connected in a single signal sensing series circuit, and preferably an even number of coils in each such sensing circuit to obtain the desired subtractive signal improvement. According to the preferred embodiments of FIGS. 1–8 there are at least two such signal sensing series circuits. If the sensing coils are respectively located in different null planes as is often preferable and there is a total of "$n-1$" sensing coils, the number of exciter coils is "$n$," the number of exciter coils of one polarity is $$\frac{n-1}{2}$$

and the number of exciter coils of opposite polarity is $$\frac{n+1}{2}$$

All of this differs from any incidental disclosure of Herrick in series connection of sensing coils.

Another place where the present application departs from the disclosure of Herrick is in the opposite polarity generation capability of sensing coils located in null planes.

Sometimes it is not desirable that adjacent coils be of opposite polarity. In this connection an interesting and valuable magnetic fact, which leads to improvements over previously disclosed pickups, is illustrated by FIGS. 10 and 11. For use with a sample 20 traveling with respect to flaw finding apparatus in the direction of arrow 30 as in FIG. 10 any individual exciter coil 11, or sensing coil 21 (or both) can be elongated or rectangular, instead of circular, enabling a single coil to look at wider sheet areas for such large defects as welds (which cross the full sheet width) and scabs (which produce exceedingly large signals and do not extend far in the direction of sheet motion). In FIG. 10 two null planes are established by having three such excitation coils 11, 12 and 13. With central axes coinciding with these null planes are two sensing coils 21 and 22, respectively.

I have discovered, through extended experiments in magnetic mapping, that the field of a single exciter coil which is elongated or rectangular, instead of circular, can be nearly identically duplicated by substantially contiguously positioned circular coils totaling about the same spanning area. But for such a result all of the contiguous coils must have the same polairty. It does not matter whether the coils are serving as exciter coils or sensing coils for the purpose of this equivalency to elongated single coils or whether connected in parallel or in series except for the advantages previously referred to. Considering FIG. 11, the exciter coils are shown all in parallel with one another while the sensing coils are shown in two groups with the coils of each group connected in series. The thing which distinguishes the arrangement in FIG. 11 from prior arrangements, is that each group of coils paralleled or series but of like polarity per group can be treated as a magnetic entity. For example, in other cases parallel or series connected coils have been individually treated, as attested by the fact that adjacent coils may be opposing in polarity or may be connected in alternate or separate individual circuits. But according to the aspect of the present invention best ilustrated by FIG. 11, it has been discovered that a specially arranged group of substantially standard coils can take the place of a very special single coil.

Nature knows few finite discontinuities and the "substantially contiguous adjacency" requirement of like polarized coils which can be treated when in a group as a single magnetic entity is difficult to define in numbers since there are so many variables. Preferably such coils are placed as close together as their physical dimensions permit. With or without a center core of ferromagnetic material the individual coils are of course solenoids, and if the solenoid diameter-to-length ratio becomes too unreasonable the discovered effect can disappear.

The FIG. 11 arrangement was found to be substantially equivalent in operation to the FIG. 10 arrangement, while improving construction economy and producing greater flexibility because, with so many exciter coils connected in parallel (while carefully preserving necessary phase relations) there is the distinct advantage of providing low exciter load impedance. By contrast, the sensing coils are connected in series by groups, resulting in higher impedance at each amplifier input and avoidance of loading one sensing coil with another. The electrical equivalent of these arrangements of FIG. 11 could not have been so readily produced with coils such as those depicted in FIG. 10.

Thus the aspect of the present invention presented by FIG. 11 pertains to situations where a condition set up by a set of coils is to be spread in area without changing function. One way to spread the area of search without changing function is to use oblong coils as in the present FIG. 10. Another solution, equally unobvious or more so, is to use as many coils closely adjacent or touching as required to cover the complete width, and an unobvious result of this is that it permits connecting one set in parallel and another in series. This is something more than an extrapolation of FIG. 10 and at first glance it would seem wasteful and inefficient to have so many coils but this disregards the fact that there are, with the FIG. 11 arrangement other advantages (e.g., standardization based on volume production of low cost components, etc.).

Hitherto unmentioned very important advantage of this arrangement of FIG. 11 might be best understood by referring back to FIGS. 1–7 of the present application in which figures are shown various means for finding defects in wide sheets. With these arrangements complicated things have to be done if the sheet changes width or moves from side to side. The edge of the sheet gives very large signals in schemes which balance as shown in FIGS. 1–8, and any such sidewise motion throws the balance off, requiring relatively expensive edge sensing controls to adjust either sheet or effective pickup position. If the defects are large enough, the schemes of FIGS. 10 and 11 can completely avoid this problem because the pickup can extend over the edges of the sheet and yet not be thrown out of balance. This obviates the need of edge control.

As previously pointed out various aspects of the present invention seem equally applicable whether the exciter coils and sensing coils are located on opposite sides of a sheet (as illustrated herein to simplify the showings) or whether they are located on the same side of a sheet or tube surface.

There is thus provided apparatus of the class described capable of meeting the objects and providing the advantages above set forth. While I have illustrated and described particular embodiments, various modifications may obviously be made without departing from the true spirit and scope of the invention which is intended to be defined only by the appended claims taken with all reasonable equivalents. By way of example, the field exciter or generating means need not even comprise coils and the field responsive pickup means need not necessarily comprise coils.

I claim:

1. In apparatus for the detection of discontinuities in sample material having thickness as a minor dimension, the combination of a plurality of "$n$" excitation generator coils disposed on a side of the sample in the direction of its thickness where "$n$" is an integer greater than three, said coils having axes which are substantially perpendicular to the sample material, a source of power, two wire connections from said source to each of said excitation generator coils, the coils being wound in space and connected to said connections such that a portion of the excitation generator coils have, with respect to location of sample material, instantaneous polarities which are opposite to the instantaneous polarities, with respect to location of sample material, of the remainder of said excitation generator coils, whereby coils of unlike polarity establish null planes extending between coils and extending through the sample material and therebeyond, a plurality of "$x$" excitation responsive sensing devices disposed on one side of the sample in the direction of its thickness and having centers of response substantially falling in said null planes established between oppositely polarized excitation generator coils, where "$x$" is a number which is a multiple of two and which is less than "$n$,"

connections connecting ½$x$ sensing devices in series with one another, connections connecting the remainder of the sensing devices in series with one another, and means for deriving a useful readout from comparison of signals from all of said connections connecting the various sensing devices.

2. In apparatus for the detection of discontinuities in sample material having thickness as a minor dimension, the combination of an odd plurality of "$n$" field generator coils disposed on a side of the sample in the direction of its thickness where "$n$" is an odd integer greater than three, a source of power and electrically conductive connections from said source to the plural generator coils, the positions of the various coils as regards their winding direction and of said connections being arranged so that $$\frac{n-1}{2}$$

of the exciter means have one instantaneous polarity nearest the sample material and $$\frac{n+1}{2}$$

of the exciter means have an opposite instantaneous polarity nearest the sample material, an even plurality of "$n-1$" field responsive pick up devices disposed on one side of the sample and having centers of effective reaction substantially falling in null planes established between oppositely polarized generator coils, a first pickup circuit comprising one-half of the pickup devices connected in series with one another, a second pickup circuit comprising the remainder of the pickup devices connected in series with one another, and means for deriving a useful readout from the combined output of the two pickup circuits.

3. The combination of claim 2 further characterized by the exciter field generator coils comprising parallel connected coils and the pickup devices comprising coils electrically connected in two groups with each of said groups having plural coils electrically connected in series in the particular group.

4. The combination of claim 3 further characterized by there being an even number of pickup coils in each group, the pickup coils being series connected in each group with half the members of the group opposing the other half as regards instantaneous polarity.

5. The combination of claim 3 further characterized by the pickup coils of each group being series connected and aiding one another as regards instantaneous polarity, all the coils of any one group being successively located in relatively close adjacency.

6. Apparatus for testing metallic sheet with relative movement of the sheet with respect to the apparatus and in the direction of the sheet length, comprising at least three exciter coil groups each substantially spanning the width of the sheet while said groups are spaced from one another in the direction of sheet length, said exciter coil groups being connected in parallel while polarized oppositely each with respect to an adjacent group, each of said exciter coil groups comprising a group of coils electrically connected in parallel with one another, each coil having its axis perpendicular to the sheet, and with the coils in any one group being like polarized and with the coils of any one group substantially continuously extending as a group across the sheet substantially transverse to the sheet length.

7. Apparatus for testing metallic sheet with relative movement of the sheet with respect to the apparatus and in the direction of the sheet length, comprising at least three exciter coil means each substantially spanning the width of the sheet while spaced from one another in the direction of sheet length, said coil means having axes of effect which are perpendicular to the sheet, at least two sensing coil means each substantially spanning the sheet width while said sensing coil means are spaced from one another in the direction of sheet length and have axes which fall in null planes between the exciter coil means, each of said sensing coil means comprising a group of sensing coils electrically connected in series with one another, each sensing coil having its axis perpendicular to the sheet, and with the connections from the respective sensing coils in any one group being like phased and with the coils of any one group substantially contiguously extending as a group transverse to the sheet length.

References Cited by the Examiner
UNITED STATES PATENTS 2,531,413 11/1950 Diome _____ 324—37
2,689,940 9/1954 Baines _____ 324—37

RICHARD B. WILKINSON, *Primary Examiner.*

WALTER L. CARLSON, *Examiner.*